(12) United States Patent
Perkins et al.

(10) Patent No.: US 6,487,099 B1
(45) Date of Patent: Nov. 26, 2002

(54) TIME COMPENSATED CURRENT RAMP FOR RESONANT POWER CONVERTERS

(75) Inventors: Jeffrey C. Perkins, Roselle, IL (US); John M. Rein, Elgin, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/938,687

(22) Filed: Aug. 24, 2001

(51) Int. Cl.[7] .............................. H02M 3/24; H02J 1/00
(52) U.S. Cl. ........................................... 363/98; 363/17
(58) Field of Search ........................... 363/98, 97, 127, 363/17, 16, 131, 132, 89, 71

(56) References Cited

U.S. PATENT DOCUMENTS

| | | | | |
|---|---|---|---|---|
| 4,648,017 A | | 3/1987 | Nerone | 363/28 |
| 4,679,129 A | * | 7/1987 | Sakakibara et al. | 363/17 |
| 4,727,469 A | | 2/1988 | Kammiller | 363/56 |
| 5,001,620 A | * | 3/1991 | Smith | 363/89 |
| 5,038,267 A | | 8/1991 | De Doncker et al. | 363/89 |
| 5,075,836 A | | 12/1991 | Suzuki et al. | 363/17 |
| 5,111,376 A | * | 5/1992 | Mehl | 363/71 |
| 5,179,511 A | | 1/1993 | Troyk et al. | 363/97 |
| 5,287,261 A | | 2/1994 | Eshani | 363/124 |
| 5,438,498 A | | 8/1995 | Ingemi | 363/17 |
| 5,646,835 A | | 7/1997 | Katcha | 363/98 |
| 5,875,103 A | | 2/1999 | Bhagwat et al. | 363/17 |

* cited by examiner

*Primary Examiner*—Rajnikant B. Patel
(74) *Attorney, Agent, or Firm*—Stetina Brunda Garred & Brucker

(57) ABSTRACT

A current mode controller for a series resonant power converter having a primary current, a conduction time and a pulse width modulator controller is disclosed. The current mode controller having a current ramp generator in electrical communication with the primary current and being operative to generate a current ramp having a voltage proportional to the primary current. A voltage ramp generator is in electrical communication with the power converter and operative to generate a voltage ramp. The current mode controller further includes a multiplier in electrical communication with the current ramp generator and the voltage ramp generator. The multiplier being operative to generate a time-dependent current ramp having an amplitude proportional to the conduction period of the power converter. A limited voltage ramp generator operative to generate a limited voltage ramp is in electrical communication with the voltage ramp generator. In this respect, the current mode controller further includes an adder in electrical communication with the limited voltage ramp generator and the multiplier and operative to generate a controlling ramp proportional to the limited voltage ramp and the time-dependent current ramp. As such, the adder is in electrical communication with the pulse width modulator controller such that the controlling ramp controls the conduction period of the power converter.

16 Claims, 2 Drawing Sheets

TIME COMPENSATED CURRENT RAMP FOR RESONANT POWER CONVERTERS

BACKGROUND OF THE INVENTION

The present invention generally relates to power converter controllers and more specifically to a current mode controller utilizing a time compensated current ramp which prevents imbalance of the inverter current of the power converter.

Power converters are known in the art and typically serve to accept energy from an unregulated energy source, such as a voltage source, and generate a regulated voltage which is applied to a load circuit. A switching device is typically used to control the transfer of energy to the load circuit in order to provide the regulated voltage. The switching device typically has two modes of operation, fully on and fully off. The switching device is periodically turned on for a time interval to permit energy transfer for the purposes of maintaining the output voltage at a predetermined level.

Typically, the switching type regulating devices employed in power converters utilize semiconductor devices such as power transistors as the switching device. These devices are turned fully on, or saturate, or fully off during operation. When fully on, the semiconductor devices are conducting and little or no power is dissipated. When nonconducting or fully off, the semiconductor devices do not dissipate power. However, power is dissipated in the semiconductor devices during the time interval of switching from nonconducting to conducting and vice versa. It is during the switching time interval that a substantial amount of power may be dissipated in such a semiconductor device.

It is desirous to provide power converters of the switching type which are cost effective, occupy small amounts of space and convert large amounts of energy efficiently. In order to achieve this goal, high frequency/high power switching power converters with a series resonant circuit and sinusoidal operating current are used. In such series resonant power converters, the on switching device is only turned on when minimal or zero current is flowing through the resonant circuit. The off switching device is turned on based on load requirements. Typically, the current of the series resonant circuit is used to control the operation of the on and off switching devices.

However, a problem arises when using the current mode control because of imbalance between the conduction period of alternate half cycles of the series resonant power converter. Specifically, the conduction period of each half cycle is terminated when the current ramp (integrated sample of the primary current) reaches the level of the error signal. The error signal represents the error between the output voltage and a fixed reference. Any difference in the initial condition of the components of the series resonant circuit, at the beginning or alternate conduction periods causes a change in the primary current. The result is a difference in conduction times for the primary current to reach the same average value. In other words, there will be multiple inverter operating points for the same ramp amplitude. Additionally, the prior art current mode control of series resonant power converters suffers from control problems at light load conditions. This occurs due to the fact that the slope of the current ramp is very shallow at the beginning of the conduction cycle for light loads.

The present invention addresses the above-mentioned deficiencies in the prior art by providing a current mode, series resonant power converter which can be used over a very wide ranges of loads, including instances where no external load is provided. Additionally, the present invention provides a control which prevents the problems of conduction time imbalance associated with the prior art current mode controllers.

BRIEF SUMMARY OF THE INVENTION

A current mode controller for a series resonant power converter having a primary current, a conduction time and a pulse width modulator controller is disclosed. The current mode controller having a current ramp generator in electrical communication with the primary current and being operative to generate a current ramp having a voltage proportional to the primary current. A voltage ramp generator is in electrical communication with the power converter and operative to generate a voltage ramp. The current mode controller further includes a multiplier in electrical communication with the current ramp generator and the voltage ramp generator. The multiplier being operative to generate a time-dependent current ramp having an amplitude proportional to the conduction period of the power converter. A limited voltage ramp generator operative to generate a limited voltage ramp is in electrical communication with the voltage ramp generator. In this respect, the current mode controller further includes an adder in electrical communication with the limited voltage ramp generator and the multiplier and operative to generate a controlling ramp proportional to the limited voltage ramp and the time-dependent current ramp. As such, the adder is in electrical communication with the pulse width modulator controller such that the controlling ramp controls the conduction period of the power converter.

In accordance with the present invention, the series resonant power converter has a drive signal and the current ramp generator has a rectifier operative to generate a rectified primary current and a first capacitor in electrical communication with the rectifier. In this respect, the first capacitor is operative to generate the current ramp from the rectified primary current.

In the preferred embodiment of the present invention, the voltage ramp generator has a second switch in electrical communication with the drive signal of the series resonant power converter. Additionally, the voltage ramp generator includes a second capacitor in electrical communication with the second switch. Accordingly, the second switch and the second capacitor are operative to generate the voltage ramp in proportion to the drive signal. The limited voltage ramp generator of the present invention comprises an amplifier in electrical communication with the voltage ramp in order to generate the limited voltage ramp. In the preferred embodiment, the controlling ramp is configured to be compared to an error signal of the pulse width modulator.

In accordance with the preferred embodiment of the present invention, there is provided a method of controlling a series resonant power converter. The method comprises generating a current ramp having a voltage proportional to the primary current and generating a voltage ramp. Next, a time-dependent current ramp is generated from the current ramp and the voltage ramp. The time-dependent current ramp has an amplitude proportional to the conduction period of the power converter. A limited voltage ramp is then generated from the voltage ramp previously generated. Finally, a controlling ramp is generated from the limited voltage ramp and the time-dependent current ramp. The controlling ramp is proportional to the limited voltage ramp and the time-dependent current ramp such that the controlling ramp controls the pulse width modulator controller.

In the preferred embodiment, the current ramp is generated by a current ramp generator and the voltage ramp is generated by a voltage ramp generator. The time-dependent current ramp is generated by multiplying the voltage ramp with the current ramp. The controlling ramp is generated by adding the limited voltage ramp with the time-dependent current ramp.

BRIEF DESCRIPTION OF THE DRAWINGS

These, as well as other features of the present invention, will become more apparent upon reference to the drawing wherein.

DETAILED DESCRIPTION OF THE INVENTION

Figure 1:
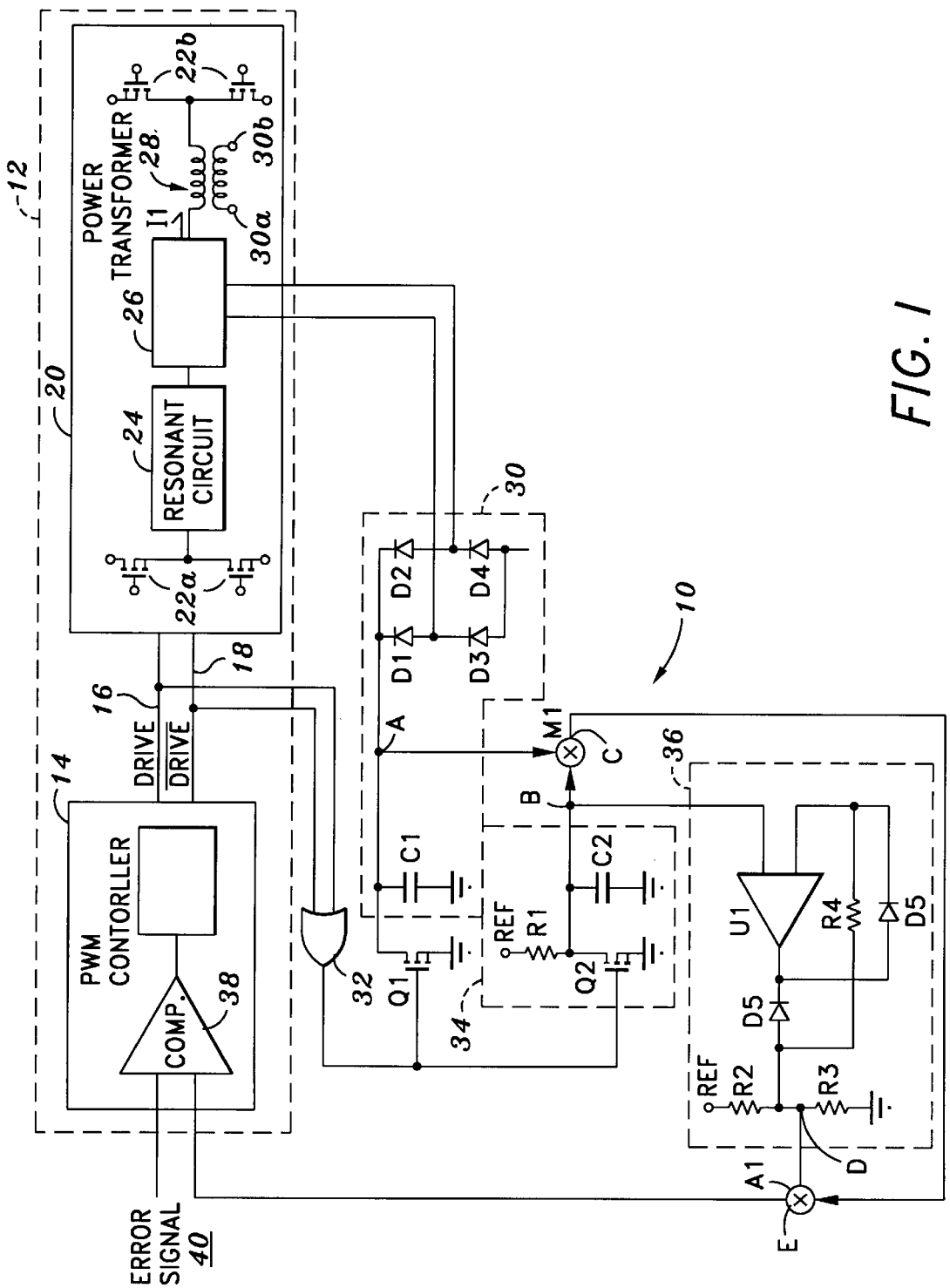
FIG. 1 is a circuit diagram of the present invention.

Referring now to the drawing wherein the showing is for the purpose of illustrating a preferred embodiment of the present invention only, and not for the purpose of limiting the same, FIG. 1 is a circuit diagram for a controller 10 of a series resonant power converter 12. The power converter 12 has a pulse width modulator (PWM) controller 14 that generates a DRIVE signal 16 and an INVERTED DRIVE signal 18 which are applied to the power converter circuit 20. The PWM controller is a conventional PWM controller such as the Unitrode UC1825. The DRIVE signal 16 and INVERTED DRIVE signal 18 are applied to power transistors 22a, 22b of the power converter circuit 20. As seen in FIG. 1, the transistors 22a are in electrical communication with resonant circuit 24 which in turn is in electrical communication with a current transformer 26. A current I1 of a power transformer 28 flows through the current transformer 26 such that current I1 can be sampled thereby. As will be recognized a load is connected across terminals 30a, 30b of the power transformer 28.

Figure 2:
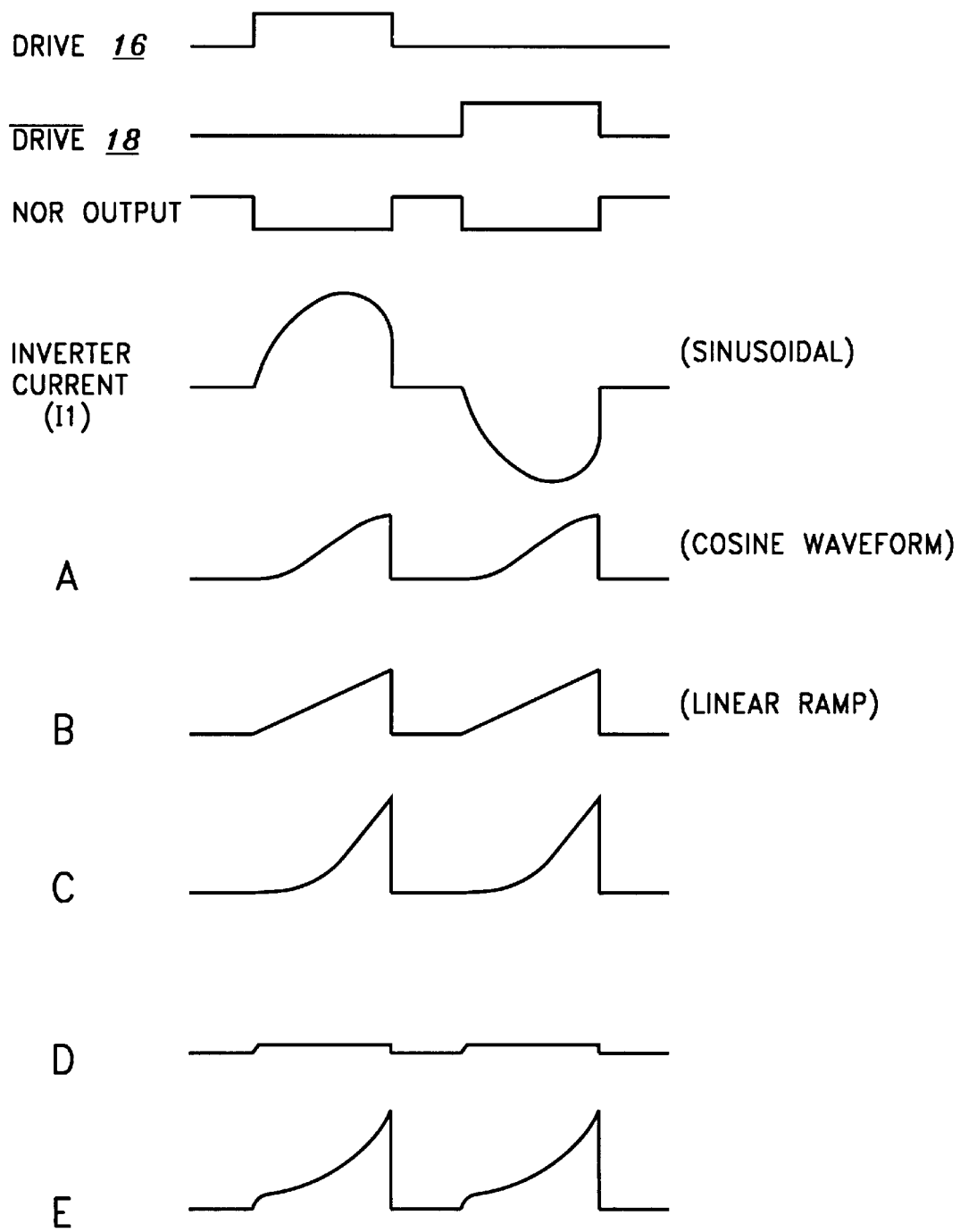
FIG. 2 illustrates representative waveforms that are generated in accordance with the present invention.

Referring more particularly to FIGS. 1 and 2, current I1 sampled by current transformer 26 is rectified by diodes D1, D2, D3 and D4 configured in a bridge network. The rectified current charges capacitor C1 thereby creating a voltage proportional to the integrated current through the power converter circuit 20. Accordingly, a current ramp is generated at node "A" by current I1, capacitor C1 and diodes D1, D2, D3, and D4 which form current ramp generator 30.

The current ramp at node "A" is reset by switching device Q1 on every half cycle of current. Specifically, Q1 is in electrical communication with DRIVE signal 16 and INVERTED DRIVE signal 18 by NOR gate 32. Therefore on every half cycle as detected by the DRIVE and INVERTED DRIVE signals 16, 18, the voltage of C1 will be reset by Q1 which will conduct during the dead time between half cycles.

In accordance with the present invention, a voltage ramp is generated at node "B" by a voltage ramp generator 34. Specifically, the voltage ramp is generated by capacitor C2 which is in electrical communication with switching device Q2 and resistor R1. Switching device Q2 is in electrical communication with DRIVE signal 16 and INVERTED DRIVE signal 18 via NOR gate 32. The values of C2 and R1 are chosen to limit the peak voltage across C2 to a fraction of the voltage REF used to supply power to resistor R1 such that good linearity of the voltage ramp is maintained.

The current ramp is multiplied by the voltage ramp by multiplier M1 which is in electrical communication with nodes "A" and "B". The multiplier M1 is a conventional voltage multiplier such as a Harris HA-2546 voltage multiplier. In this respect, the multiplier M1 generates a time-dependent current ramp at node "C" having an amplitude proportional to the conduction period of the power converter circuit 20.

In addition to the foregoing, the controller 10 constructed in accordance with the present invention further includes a limited voltage ramp generator 36 which generates a limited voltage ramp. Specifically, the voltage ramp present at node "B" that was generated by voltage ramp generator 34 is limited by amplifier U1, resistors R2, R3, R4 and diodes D5, D5. In this respect, the limited voltage ramp generated at node "D" is similar to the voltage ramp generated at node "C", but has been limited to a prescribed value.

The limited voltage ramp generated at node "D" is summed with the time-dependent current ramp at node "C" by a conventional adder A1. In this respect, the adder A1 is in electrical communication with the multiplier M1 and the limited voltage ramp generated by limited voltage ramp generator 36. The adder A1 generates a controlling ramp at node "E" which is proportional to the limited voltage ramp and the time-dependent current ramp.

As seen in FIG. 1, the controlling ramp is used as one of the inputs to a comparator 38 of PWM controller 14. The other input to the comparator 38 is an error signal 40. The controlling ramp is compared to the error signal 40 by comparator 38 such that the conduction cycle (i.e. DRIVE signal 16) is terminated when the controlling ramp exceeds the error signal 40. In this respect, the controlling ramp will control the generation of the DRIVE signal 16 and corresponding INVERTED DRIVE signal 18 by the PWM controller 14. The controller 10 thereby generates the controlling ramp which is a function of the time-dependent current of the power converter circuit 20 and a generated voltage ramp. Accordingly, the power converter circuit 20 benefits by having a DRIVE signal 18 dependent upon the time-dependent current thereof such that half cycle imbalance problems or poor performance at light loads is not present.

Additional modifications and improvements of the present invention may also be apparent to those of ordinary skill in the art, such as using different components. Thus, the particular combination of parts described and illustrated herein is intended to represent only certain embodiments of the present invention, and is not intended to serve as limitations of alternative devices within the spirit and scope of the invention.

What is claimed is:

1. A current mode controller for a series resonant power converter having a primary current, a conduction period and a pulse width modulator controller, the current mode controller comprising:

a) a current ramp generator in electrical communication with the primary current, the current ramp generator being operative to generate a current ramp having a voltage proportional to the primary current;

b) a voltage ramp generator in electrical communication with the power converter, the voltage ramp generator being operative to generate a voltage ramp;

c) a multiplier in electrical communication with the current ramp generator and the voltage ramp generator, the multiplier being operative to generate a time-dependent current ramp having an amplitude proportional to the conduction period of the power converter;

d) a limited voltage ramp generator in electrical communication with the voltage ramp generator, the limited voltage ramp generator being operative to generate a limited voltage ramp; and e) an adder in electrical communication with the limited voltage ramp generator and the multiplier, the adder being operative to generate a controlling ramp proportional to the limited voltage ramp and the time-dependent current ramp;

f) wherein the adder is in electrical communication with the pulse width modulator controller such that the controlling ramp controls the conduction period of the power converter.

2. The current mode controller of claim 1 wherein the series resonant power converter has a drive signal and the current ramp generator comprises:

a) a rectifier in electrical communication with the primary current and operative to generate a rectified primary current; and b) a first capacitor in electrical communication with the rectifier;

wherein the first capacitor is operative to generate the current ramp.

3. The current mode controller of claim 2 wherein the rectifier is a bridge rectifier.

4. The current mode controller of claim 1 wherein the series resonant power converter has a drive signal and the voltage ramp generator comprises:

a) a second switch in electrical communication with the drive signal; and b) a second capacitor in electrical communication with the second switch;

d) wherein the second switch and the second capacitor are operative to generate the voltage ramp in proportion to the drive signal.

5. The current mode controller of claim 1 wherein the limited voltage ramp generator comprises an amplifier in electrical communication with the voltage ramp.

6. The current mode controller of claim 1 wherein the controlling ramp is configured to be compared to an error signal by the pulse width modulator.

7. A method of controlling a series resonant converter having a primary current and a pulse width modulator controller, the method comprising the steps:

a) generating a current ramp having a voltage proportional to the primary current;

b) generating a voltage ramp;

c) generating a time-dependent current ramp from the current ramp and the voltage ramp, the time-dependent current ramp having an amplitude proportional to the conduction period of the power converter;

d) generating a limited voltage ramp from the voltage ramp; and e) generating a controlling ramp from the limited voltage ramp and the time-dependent current ramp, the controlling ramp being proportional to the limited voltage ramp and the time-dependent current ramp such that the controlling ramp controls the pulse width modulator controller.

8. The method of claim 7 wherein step (a) comprises generating the current ramp with a current ramp generator in electrical communication with the primary current.

9. The method of claim 7 wherein step (b) comprises generating the voltage ramp with a voltage ramp generator in electrical communication with the power converter.

10. The method of claim 7 wherein step (c) comprises generating the time-dependent current ramp with a multiplier in electrical communication with the voltage ramp and the current ramp.

11. The method of claim 7 wherein step (d) comprises generating the limited voltage ramp with a limited voltage ramp generator in electrical communication with the voltage ramp.

12. The method of claim 7 wherein step (e) comprises generating the controlling ramp with an adder in electrical communication with the limited voltage ramp and the time-dependent current ramp.

13. The method of claim 7 further comprising the steps:

a) applying the controlling ramp to the pulse width modulator; and b) modulating the conduction time of the power converter in response to the controlling ramp applied.

14. A method of controlling a series resonant power converter having a conduction time, the method comprising the steps:

a) sampling the primary current of the series resonant power converter;

b) determining the conduction time of the series resonant power converter; and c) generating a controlling ramp that is a function of the primary current and the conduction time in order to control the operation of the series resonant power converter.

15. The method of claim 14 wherein step (c) comprises applying the controlling ramp to a pulse width modulator of the series resonant power converter in order to control the conduction time thereof.

16. The method of claim 14 wherein:

a) step (a) comprises generating a time dependent current ramp from the primary current;

b) step (b) comprises generating a voltage ramp from the conduction time; and c) step (c) comprises generating the controlling ramp by adding the controlling ramp and the voltage ramp.

* * * * *